United States Patent [19]
Exline

[11] Patent Number: 6,089,608
[45] Date of Patent: Jul. 18, 2000

[54] BOOKLET

[75] Inventor: William B. Exline, Chagrin Falls, Ohio

[73] Assignee: William Exline, Inc., Cleveland, Ohio

[21] Appl. No.: 09/064,416

[22] Filed: Apr. 22, 1998

[51] Int. Cl.⁷ .................................................. B42D 1/00
[52] U.S. Cl. ...................... 281/21.1; 156/250; 156/290; 156/304.6; 156/580; 281/2; 281/3.1; 281/5; 281/15.1; 281/29; 283/36; 283/56
[58] Field of Search ........................ 281/2, 3.1, 5, 21.1, 281/29, 31, 38, 15.1, 37; 283/34, 36, 56; D3/247; 156/250, 256, 290, 291, 580, 581, 282, 304.6

[56] References Cited

U.S. PATENT DOCUMENTS

| | | |
|---|---|---|
| 286,650 | 10/1883 | Talcott . |
| 807,648 | 12/1905 | Wiggins . |
| 1,912,710 | 6/1933 | Kennedy . |
| 2,294,796 | 9/1942 | Moulder . |
| 2,634,777 | 4/1953 | Berger ........................ 150/59 |
| 2,718,911 | 9/1955 | Solomon ..................... 150/39 |
| 2,722,369 | 11/1955 | Reuter . |
| 2,767,756 | 10/1956 | Niles .......................... 150/39 |
| 3,201,146 | 8/1965 | Tilton, Jr. ................... 281/31 |
| 3,310,321 | 3/1967 | Freund ........................ 281/31 |
| 3,360,027 | 12/1967 | Price ........................... 150/39 |
| 3,433,279 | 3/1969 | Seamon ...................... 150/39 |
| 3,537,728 | 11/1970 | Reese .......................... 281/31 |
| 4,216,979 | 8/1980 | Janik .......................... 283/58 |
| 4,492,390 | 1/1985 | Jacobs et al. ............... 281/31 |
| 4,520,958 | 6/1985 | Jones et al. . |
| 4,583,763 | 4/1986 | Shacklett, Jr. . |
| 4,586,729 | 5/1986 | Beylerian ..................... 281/5 |
| 4,620,725 | 11/1986 | Maehashi ..................... 281/45 |
| 4,621,729 | 11/1986 | Jackson ....................... 206/37 |
| 4,758,469 | 7/1988 | Lange . |
| 4,824,142 | 4/1989 | Dossche . |
| 4,896,027 | 1/1990 | Drexler ...................... 235/488 |
| 5,143,405 | 9/1992 | Daneshvar .................. 281/31 |
| 5,156,898 | 10/1992 | McDonald .................. 428/100 |
| 5,342,093 | 8/1994 | Weernink . |
| 5,362,103 | 11/1994 | Bromberg ................... 281/29 |
| 5,421,620 | 6/1995 | Sauerwine . |
| 5,468,231 | 11/1995 | Newman et al. . |
| 5,487,566 | 1/1996 | Hedge, Jr. . |
| 5,595,401 | 1/1997 | Exline et al. ................. 281/2 |
| 5,800,659 | 9/1998 | Exline et al. ............... 156/250 |
| 5,951,190 | 9/1999 | Wilson ....................... 281/31 |

OTHER PUBLICATIONS

William Exline Brochure, Jan., 1995.
U.S. application No. 08/783813, filed Jan. 16, 1997.

*Primary Examiner*—Andrea Pitts
*Assistant Examiner*—Monica Smith Carter
*Attorney, Agent, or Firm*—Rhodes, Coats & Bennett L.L.C.

[57] ABSTRACT

An improved booklet of the present invention comprises: (a) a cover having a fold which divides the cover into a front cover panel and a rear cover panel wherein each panel has an inner and an outer surface where at least one of said inner surfaces is vinyl treated latex saturated paper substrate; (b) a vinyl sheet heat sealed along three adjacent edges to said surface of said vinyl treated paper substrate thereby forming a pocket between said vinyl sheet and said vinyl treated paper substrate and further leaving one non-sealed edge; and (c) a plurality of leaves each attached along at least one marginal edge to the fold, the leaves forming pages in the booklet.

10 Claims, 1 Drawing Sheet

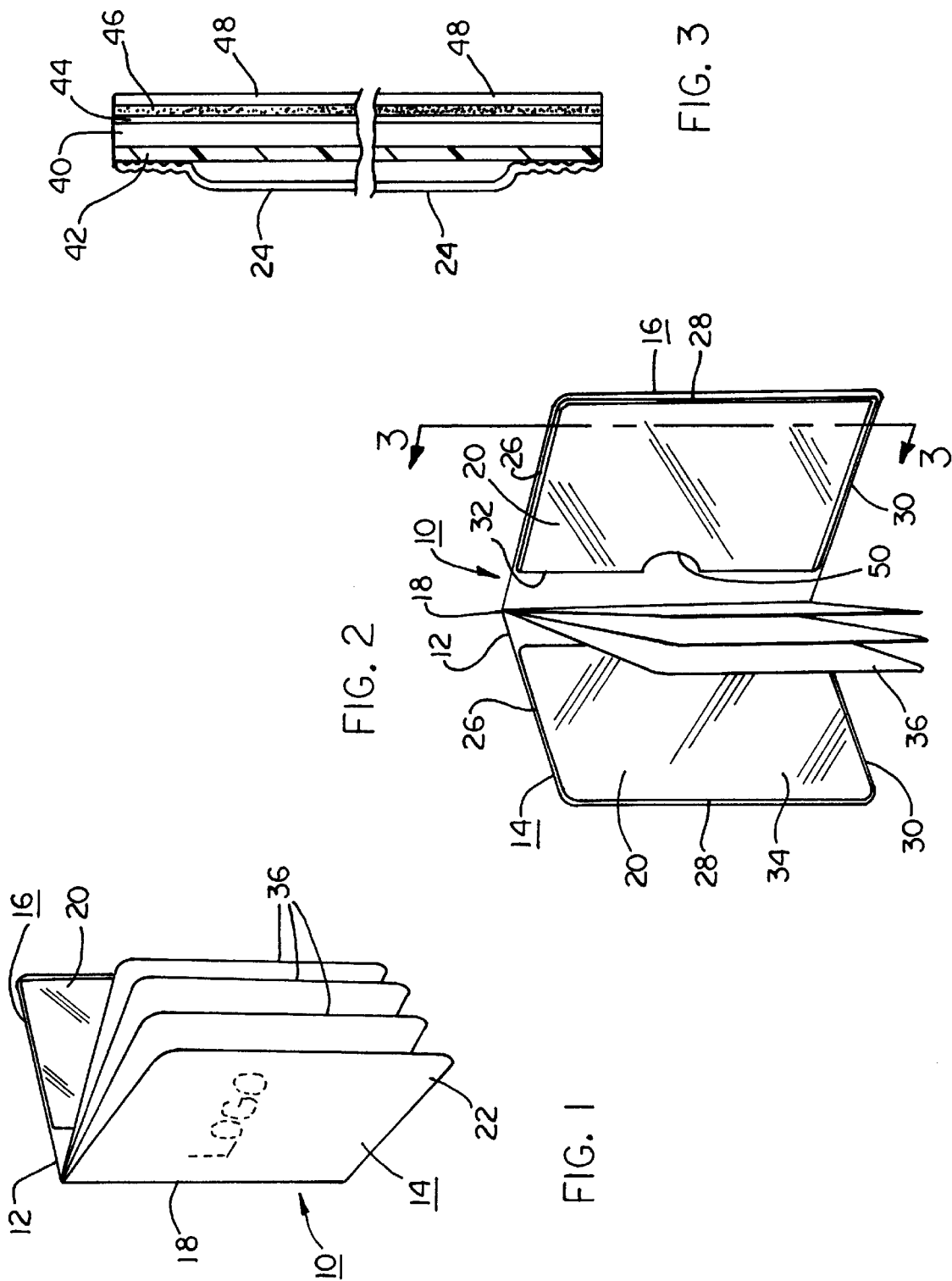

BOOKLET

BACKGROUND OF THE INVENTION (1) Field of the Invention

The present invention relates generally to a booklet for recording information, such as bank transactions, appointments, schedules, tasks or the like, that also is designed to hold and protect identification and/or smart cards. Smart cards are any cards, like a credit or debit card, with embedded information storage capability, such as with a magnetic strip or microchip or the like. The booklet has a pocket formed by heat sealing a sheet to an inner surface of a cover panel that is made of treated paper substrate. The sheet and treatment materials must be compatible for heat sealing, for example, a vinyl sheet sealed to a vinyl treated paper substrate.

(2) Description of the Prior Art

Various booklets or folders having card pockets and a place to record information or transactions are currently in use.

For example, U.S. Pat. No. 5,143,405 (Daneshvar) discloses a booklet for collecting and presenting personal medical information. Although the booklets include pockets formed in the covers of the booklets, the disclosure provides that the pockets may be used to hold additional papers containing medical information. Thus, there is no indicated use of the pockets for securely holding and protecting identification and credit cards.

U.S. Pat. No. 4,621,729 (Jackson) discloses a patient medical information and education sheathe. Although a pocket is provided which serves to hold a plurality of cards or the like, the user must open a plurality of panels of the sheathe to retrieve a card from the pocket.

U.S. Pat. No. 2,767,756 (Niles) discloses a foldable unit plastic card holder designed to hold a number of cards. However, the card holder does not include any pages on which to record transactions or maintain record-keeping.

U.S. Pat. No. 3,360,027 (Price) discloses a ticket and money holder provided with openings with arcuate lower edges through which tickets and the like may be inserted into and removed from the holder. The holder includes an outer sheet that is stitched to a filler.

One booklet, developed by the inventors of the present invention, uses a resin emulsion adhesive applied to the entire inner surface of standard paper cover in forming the pocket. (See, U.S. Pat. No. 5,595,401 to Exline et al. and co-pending continuation-in-part U.S. application Ser. No. 08/783,813, filed Jan. 16, 1997, the disclosures of each are hereby incorporated by reference in their entireties.) A pocket is formed by first completely adhering a first leaf (smaller in size than the cover) to the cover to leave an L-shaped adhesive strip exposed along two marginal edges of the inner surface of the cover. As a result, a second leaf was adhered to the L-shaped adhesive strip that remained exposed on the inner surface of the cover, thereby forming a pocket with a third edge being attached at the fold and a fourth edge remaining open for receiving a card.

The booklets are placed in dies in air-powered vises, and thereafter squeezed together in order to set the adhesive. As a result, a pocket was created, formed by sealing the first leaf and part of the second leaf to the inner surface of the cover using the L-shaped adhesive strip.

The adhesive for the strip is selected from the group consisting of latexes of polyvinyl ethylene, polyvinyl acetate, acrylics and any copolymer thereof, natural rubber latex, natural rubber solvent-based, protein glue, carbohydrate polymer, aerobic adhesives, cyanoacrylates, silicones, and epoxy resins. The preferred adhesive in the '401 patent is polyvinyl acetate copolymer latex with a glass transition temperature (Tg) approximately near or below room temperature. The use of a resin emulsion adhesive, preferably a polyvinyl acetate copolymer emulsion, makes it possible to create a properly formed pocket for holding and protecting the card.

While the overall design of the '401 patent and its improvements have been successful commercially, there still remains a need for an improved booklet which can be produced more efficiently to meet the ever-increasing demands for booklets for the designated purpose. Moreover, there remains a demand for a bonding technique whereby a pocket may be formed inside the cover while eliminating the need for adhesives and adhesive strips, thereby eliminating the additional costs and processing steps associated therewith.

SUMMARY OF THE INVENTION

The present invention relates to an improved booklet for the described purpose. The improvements include materials and construction changes to the cover and pocket portion of the booklet. Particularly, the improvement entails the use of a treated paper substrate sealed to a sheet of material that is compatible with the treatment material. The sheet is sealed along three edges leaving one non-sealed edge and, thus, creates a pocket.

The treated paper substrate has two surfaces: a treated surface and a starch coated surface. The treated surface receives a vinyl sheet affixed thereto that forms the pocket. The starch coating is preferred because it improves glueability of a decorative cover, however, other coatings or no coating may be used. The starch coated side may be attached to a variety of other materials such as cover stock, plain paper, other treated paper substrates, or left as starch coated paper depending on the booklet function.

The material used to treat the paper substrate and to form the sheet may be formed of any suitable material with a PVC content that may be heat sealed including but not limited to vinyl, polypropylene, polyvinyl chloride, polyvinyl acetate, phenol formaldehyde, urea formaldehyde, melamine or resorcinol. The treated paper substrate may be acrylic latex saturated base paper treated with any organic, polar material of poor conductivity including any of the above-listed materials, as long as the treatment is compatible with the sheet material to form a heat seal.

In accordance with the preferred embodiment of the present invention, the booklet comprises: (a) a cover having a front and a rear panel joined along a common edge with each panel therefore having an inner and an outer surface wherein at least one inner surface is vinyl treated latex saturated paper substrate; for example, like Premahyde #63 manufactured by Rexam DSI of Matthews, NC or Vy-Hyde manufactured by Gane Brothers & Lane, Inc. of New York, N.Y.; (b) a vinyl sheet which is sealed along three (3) adjacent edges to the surface of the inner panel(s) which is made of treated paper substrate thereby forming a pocket between the treated paper substrate and the vinyl sheet; and (c) a plurality of leaves attached at the common edge to form pages.

The heat seal creates a properly formed pocket for holding and protecting the card itself as well as protecting the information on the card.

A substantially narrower seal edge along three adjacent sides is preferred. If the seal edge is minimal, the pocket volume P larger and more useful. Accordingly, the seal must possess a minimal width as well as sufficient strength and sufficient bond flexibility for use in the booklet of the present invention.

The preferred process to create the seal is by dielectrically heat sealing the sheet to the treated paper substrate. Applying radio frequency to the area to be sealed produces heat and upon the exertion of appropriate pressure a seal is created. This particular process allows the seal edge to be preserved as minimal. Other appropriate processes to create the heat seal may also be used.

These and other aspects of the present invention will become apparent to those skilled in the art after a reading of the following description of the preferred embodiment when considered with the drawings.

BRIEF DESCRIPTION OF THE DRAWINGS

FIG. 1 is a perspective outer view of an embodiment of the present invention with pockets configured on at least one inside cover panel constructed according to the present invention;

FIG. 2 is a perspective inner view of an embodiment of the present invention with pockets configured on both inside cover panels; and FIG. 3 is an enlarged, partial sectional view taken substantially along the line 3—3 of a booklet of the present invention.

DESCRIPTION OF THE PREFERRED EMBODIMENTS

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

The booklet 10 has a cover 12 made of a front cover panel 14 and a rear cover panel 16 joined along a common edge 18 by any appropriate means. The cover 12 may be made of separate panels bound by any appropriate means along the common edge 18. The cover 12, preferably may be formed by folding a single treated paper substrate sheet in half to divide the cover into front 14 and rear 16 panels thereby creating the common edge 18 at the fold.

Each panel, front 14 and rear 16, has an inner 20 and outer 22 surface. At least one of the inner surfaces 20 must be treated paper substrate, so that a sheet 24, made from material compatible with the treatment material, may be sealed along three adjacent edges 26, 28, 30 to leave one non-sealed edge 32 and form a pocket 34 between the sheet 24 and the treated paper substrate surface.

A plurality of leaves 36 are also each attached along the common, binding edge 18 to form pages in the booklet 10. The leaves 36 of the book may be attached to the common edge or fold 18 using any suitable method including but not limited to stitching, stapling or gluing.

Referring particularly to FIG. 3, the treated paper substrate is preferably an acrylic latex saturated paper base sheet 40 treated with at least 3 mils of polymeric plasticized vinyl 42. This vinyl treated paper substrate is commercially available as Premahyde #63 manufactured by Rexam DSI of Matthews, NC or Vy-Hyde manufactured by Gane Brothers & Lane, Inc. of New York, N.Y. The treatment, additionally, may be any suitable material including but not limited to polypropylene, polyvinyl chloride, polyvinyl acetate, phenol formaldehyde, urea formaldehyde, melamine or resorcinol.

The vinyl treated paper substrate, thus, has a vinyl treated side 42 and a starch coated side 44. The treated side surface 42 forms the pocket 34 with the vinyl sheet 24 to which it is attached. Preferably, starch coating is applied to enhance glueability. The starch coated side 44 may be glued 46 through conventional means such as hot melt, synthetic or animal glue to a variety of materials for different functions. For example, the starch coated side 44 may be glued 46 to any suitable cover stock 48, such as KIVAR® from Decorative Specialties International, Inc. of South Hadley, Mass., or PAJCO® from Pajco Products of Lowville, N.Y., or any suitable lexide material or even plain paper.

The starch coated side 44 of the treated paper substrate may glued to any suitable cover stock 48 to serve as the outer cover surface 22. Consequently, as shown in FIG. 1, indicia, for example, a logo, may be placed on the front cover panel 14 of the booklet 10.

The pocket sheet 24 may be formed of any compatible material with a PVC content that allows it to heat seal to the treated paper substrate including but not limited to vinyl, polypropylene, polyvinyl chloride, polyvinyl acetate, phenol formaldehyde, urea formaldehyde, melamine or resorcinol.

The preferred sealing process uses a radio frequency of between about 26.96 MegaHertz to 27.30 MegaHertz to generate heat. Pressure is applied along the desired edges 26, 28, 30 and a seal is formed, although no specific pressure is required. If too much pressure is applied, however, damage may occur to the set up but not the product. The process can be accomplished at any temperature between about room temperature and 300° F.

The remaining non-sealed edge 32 may face in any direction, toward the common edge 18, away from the common edge 18, toward the bottom or toward the top of the booklet 10. Additionally, it is preferred that the remaining, non-sealed edge 32 of the sheet has a thumb cut 50 to ease the removal of a card from the pocket 34.

By way of example, one embodiment of the present invention may be for use with student identification cards. The multi-pocketed booklet could hold the student's i.d. card as well as other cards while the leaves inside the booklet are preprinted with a calendar or schedule template and also it may contain some blank pages.

In another embodiment, the booklet may be used in conjunction with bank transactions and thus would be of a suitable configuration to hold a conventional size smart card. The leaves may be blank or preprinted with templates to record bank matters.

While this invention has been illustrated and described in accordance with a preferred embodiment, it is recognized that variations and changes may be made therein without departing from the invention as set forth in the claims.

Certain modifications and improvements will occur to those skilled in the art upon a reading of the forgoing description. By way of example, it is contemplated that the booklet of the present invention can be modified for a variety of industries including but not limited to financial institutions, telecommunications, healthcare, information security, travel, hospitality, hospitality and prepaid vending. The booklet may, therefore, be customized to hold information about a particular organization and inter alia its services and programs.

It should be understood that all such modifications are not contained herein for the sake of conciseness and readability, but are properly within the scope of the following claims.

We claim:

1. A booklet comprising:
   a) a cover having a front cover panel and a rear cover panel joined along a common edge wherein each panel has an inner and an outer surface with at least one of said inner surfaces being so treated as to receive a pocket sheet in heat sealing arrangement thereto, wherein the inner surface is acrylic latex saturated paper substrate having a polymeric vinyl layer of at least about 3 mils thickness applied thereto;
   b) a vinyl sheet sealed along three adjacent edges to said inner surface thereby forming a seal and a pocket between said sheet and said inner surface and further leaving one non-sealed edge;
   c) a plurality of leaves each attached to said cover along said common edge, the leaves forming pages in the booklet.

2. The booklet according to claim 1, wherein the sheet and treatment material are compatible material selected from the group consisting of vinyl, polypropylene, polyvinyl chloride, polyvinyl acetate, phenol formaldehyde, urea formaldehyde, melamine, and resorcinol.

3. The booklet according to claim 1, wherein the remaining non-sealed edge of the sheet has a thumb cut.

4. The booklet according to claim 1, wherein the cover is formed of a single sheet having a fold which divides the cover into said front cover panel and said rear cover panel with said fold forming said common edge.

5. The booklet according to claim 1, wherein the cover is formed of independent panels that are bound along said common edge.

6. The booklet according to claim 1 having only a single pocket configuration.

7. The booklet according to claim 1 having a multiple pocket configuration.

8. The booklet according to claim 1 wherein said outer cover panel surfaces are cover stock material.

9. The booklet according to claim 8 wherein said outer cover panel surface is defined with indicia.

10. The booklet according to claim 1 wherein the cover has a treated side and a starch coated side and said starch coated side is attached to cover stock material.

* * * * *